A. CHAMBERS.
FASTENING DEVICE FOR AUTOMOBILES.
APPLICATION FILED FEB. 2, 1916.
1,306,799.
Patented June 17, 1919.
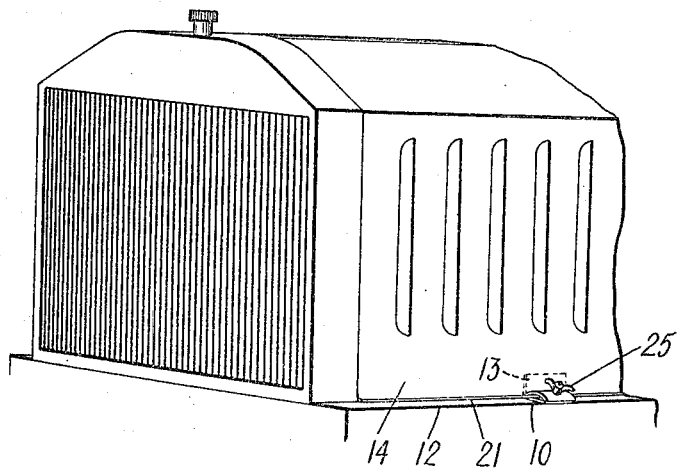
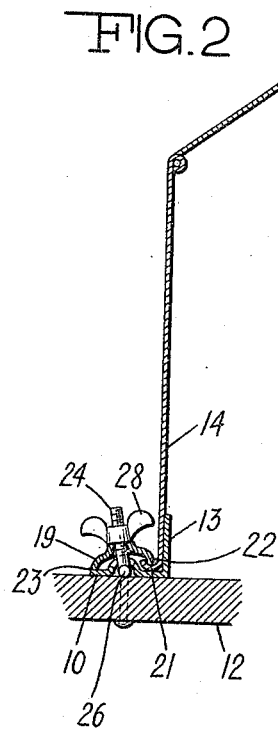
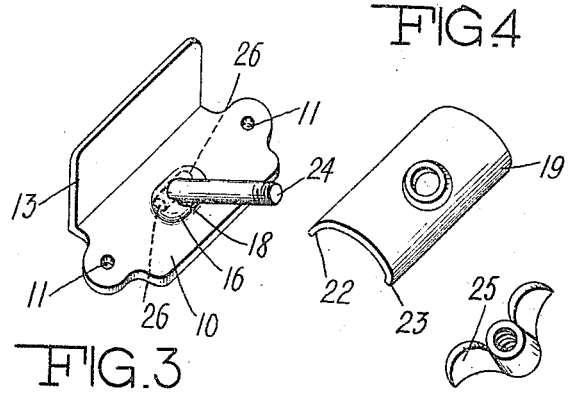
Adam Chambers, INVENTOR.
BY
Wm. J. Dolan, ATTORNEY

UNITED STATES PATENT OFFICE.

ADAM CHAMBERS, OF NEW YORK, N. Y.

FASTENING DEVICE FOR AUTOMOBILES.

1,306,799.   Specification of Letters Patent.   Patented June 17, 1919.

Application filed February 2, 1916. Serial No. 75,867.

*To all whom it may concern:*

Be it known that I, ADAM CHAMBERS, a citizen of the United States, and a resident of New York city, Bronx county, and State of New York, have made certain new and useful Improvements in Fastening Devices for Automobiles, of which the following is a specification.

The invention relates to fastening devices, particularly for the hoods of automobiles.

Objects of the invention are to provide an improved device by means of which the hood of an automobile may be securely fastened to the frame of the vehicle in such manner as to prevent the disagreeable rattling of the hood now so common with certain types of automobile; and to provide a device of this character which shall be simple and cheap in construction, inconspicuous, and highly efficient in operation; and which may be readily and quickly operated. Other objects of the invention will be apparent to those skilled in the art.

The invention consists in the novel parts, improvements, combinations, and devices of construction set forth in the following description.

In the accompanying drawing, which is referred to herein and forms part hereof, is illustrated an embodiment of the invention, the same serving in connection with the description herein to illustrate the principles of the invention.

Of the drawing:—

Figure 1 is a perspective view of an embodiment of the invention, illustrating the same as attached to the frame of an automobile and as securing in place the hood of the vehicle;

Fig. 2 is a cross-section of the same;

Fig. 3 is a perspective view of portions of an embodiment of the device; and

Figs. 4 and 5 are perspective views of details.

A fastening device constructed in accordance with certain principles of the invention includes in combination a base element adapted to engage with the hood of an automobile; a connecting member movably mounted on said base, a clamping member arranged on said connecting member; and a securing member arranged to coöperate with said clamping and connecting members, whereby the clamping member will be held in fixed relation with the hood, and the latter prevented from vibrating.

In the preferred embodiment of the invention said base element has an upstanding flange with which the side wall of the hood engages; said connecting member consists of a bolt with cross-heads at one end fitting in a recess formed in the base element; the clamping member is a plate ovoid in cross-section and is slidably mounted on the connecting bolt; and the securing member is in the form of a wing-nut, by means of which the clamping member may be rigidly secured against the wall of the automobile.

Referring now in detail to the drawing, the embodiment of the invention illustrated comprises a base element, which preferably consists of a plate portion 10 whose body is preferably rectangular and which is adapted to be secured as by bolts 11, passing through orifices in extensions at the respective ends of said plate, to the frame 12 of an automobile, and a flange 13 upwardly extending and with which the side 14 of the hood of the vehicle may be engaged. For a purpose presently to be explained, the plate 10 has, preferably and as shown, a central upwardly rising hollow portion or member 16 forming a recess, and said portion 16 is formed with a slot 18 therein, extending preferably in a direction laterally transverse of the plate 10.

Means are provided for holding the wall 14 of the hood in secure engagement with the flange 13 of the fastening device, and, preferably and as shown, said means comprise a clamping member 19 which, when the side 14 is in engagement with the flange 13, may be arranged to clamp said side against said flange and hold said side rigidly fastened in such position. In a common construction of hood, as for example the hood of the Ford automobile, the lower edge of the side of the hood is formed with an upwardly extending flange or rim 21. In order that the clamp 19 may also act to hold the side 14 in rigid engagement with the flange 13, when the flange or rim 21 is present, and also in order that the clamp 19 may not be interfered with by the member 16 on the plate 10, said clamp 19 is preferably made of an area co-extensive with that of the main or body portion 10 and transversely ovoid in form so that its inner edge 22 may in operation be pressed down upon said flange 21, while the opposite or outer longitudinal edge 23 of the clamp will be held in rigid engagement with the main or body portion of said plate 10. It will be obvious that such edge 22 may also be pressed directly against the side 14 of the hood and hold it securely clamped against the said flange 13.

Means are also provided for clamping the member 19 against the side 14 or its rim 21. In the preferred embodiment of the invention illustrated a bolt 24 is arranged with one end in the recess formed by the portion 16 of the plate 10 and on this end said bolt 24 is provided with horizontal cross-heads 26 as shown circular in cross-section, by means of which the bolt 24 is loosely held at one end in the recess formed by the member 16 and yet is permitted to reciprocate laterally in the slot 18. The clamping member 19 is arranged on the bolt 24, and, preferably, is held in any pre-determined position by means of a wing-nut 28.

It will be seen that the bolt 24 may be swung away from the hood 14, when desired, until the latter is placed in its normal closed position, when the bolt 24 with the clamp 19 and the wing-nut 28 arranged thereon may be swung into operative position so that the member 19 will engage with said wall 14 or, as illustrated in Fig. 2 of the drawing, will overlie the rim 21 of the hood; and, when in either of these positions, the clamp 19 may be held rigidly in contact with either the side 14 or the rim 21, as the case may be, by screwing the wing-nut 28 into close engagement with the clamp 19. The hood will then be held securely in place and the objectionable rattling obviated.

It will be seen that a fastening device constructed in accordance with the invention will carry out the objects of the invention as herein stated and will possess other advantages which will be apparent to those skilled in the art.

In its broader aspects, the invention is not limited to the precise construction by which the same has been or may be carried into effect, as many changes may be made in the details thereof without departing from the main principles of the invention or sacrificing its chief advantages.

I claim:

The combination with an automobile frame and a hood thereon, of a base plate secured to said frame and having a part rising therefrom adapted to contact with an inner wall of said hood, a connecting member provided with an elongated head journaled in said plate for lateral movement between the hood and the frame, an overlying clamp engaging said member so as to bear at opposite points upon the hood and the plate, and means for holding said clamp in a fixed position.

In testimony whereof, I have signed my name to this specification.

ADAM CHAMBERS.

Copies of this patent may be obtained for five cents each, by addressing the "Commissioner of Patents, Washington, D. C."